United States Patent
Miller et al.

(10) Patent No.: US 11,048,646 B2
(45) Date of Patent: Jun. 29, 2021

(54) I/O AUTHORIZATION CONTROL IN SHARED STORAGE SYSTEMS

(71) Applicant: International Business Machines Corporation, Armonk, NY (US)

(72) Inventors: Dash D. Miller, St. Louis Park, MN (US); Tabor R. Powelson, Poughkeepsie, NY (US); David C. Reed, Tucson, AZ (US); Jamie Storey, Mesa, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/959,185

(22) Filed: Apr. 21, 2018

(65) Prior Publication Data
US 2019/0324924 A1 Oct. 24, 2019

(51) Int. Cl.
*G06F 12/14* (2006.01)
*G06F 3/06* (2006.01)
*G06F 12/1018* (2016.01)

(52) U.S. Cl.
CPC ........ *G06F 12/1483* (2013.01); *G06F 3/067* (2013.01); *G06F 3/0622* (2013.01); *G06F 3/0664* (2013.01); *G06F 12/1018* (2013.01); *G06F 2212/1052* (2013.01)

(58) Field of Classification Search
CPC ........ G06F 2212/1052; G06F 12/1483; G06F 12/1018
See application file for complete search history.

(56) References Cited

U.S. PATENT DOCUMENTS

| | | | |
|---|---|---|---|
| 7,328,287 B1 * | 2/2008 | Arumugham | G06F 3/0605 709/203 |
| 7,613,897 B2 | 11/2009 | Armstrong et al. | |
| 8,732,354 B1 * | 5/2014 | Salli | G06F 3/0659 710/36 |
| 8,959,263 B2 | 2/2015 | Sokol, Jr. et al. | |
| 9,274,817 B1 | 3/2016 | Fan et al. | |
| 2007/0016893 A1 | 1/2007 | Branda et al. | |
| 2007/0283115 A1 * | 12/2007 | Freeman | G06F 12/1475 711/163 |

(Continued)

OTHER PUBLICATIONS

Peter, Simon, et al. "Arrakis: The operating system is the control plane." ACM Transactions on Computer Systems (TOCS), vol. 33, Issue 4, Jan. 2016, Article No. 11.

(Continued)

*Primary Examiner* — Jane Wei
(74) *Attorney, Agent, or Firm* — Nelson and Nelson; Daniel P. Nelson

(57) ABSTRACT

A method for limiting I/O access in shared storage systems is disclosed. In one embodiment, such a method includes establishing, for a volume, a list of address spaces that are authorized to access the volume. The method further receives an I/O request to access the volume and determines whether the I/O request originates from one of the address spaces identified in the list. If the I/O request originates from one of the address spaces in the list, the method passes the I/O request to the volume. If, on the other hand, the I/O request does not originate from one of the address spaces in the list, the method blocks the I/O request. A corresponding system and computer program product are also disclosed.

17 Claims, 6 Drawing Sheets

(56) References Cited

U.S. PATENT DOCUMENTS

| | | | |
|---|---|---|---|
| 2008/0133486 A1 | 6/2008 | Fitzgerald et al. | |
| 2010/0058340 A1 | 3/2010 | Kamada | |
| 2010/0313067 A1* | 12/2010 | Resnick | G06F 11/1044 |
| | | | 714/6.12 |
| 2016/0042030 A1 | 2/2016 | Bertram et al. | |
| 2016/0147672 A1* | 5/2016 | Atzmon | G06F 12/1441 |
| | | | 711/163 |
| 2019/0042464 A1* | 2/2019 | Genshaft | G06F 12/1018 |

OTHER PUBLICATIONS

Xu, Weixia, et al., "Hybrid hierarchy storage system in MilkyWay-2 supercomputer." Frontiers of Computer Science, Jun. 2014, vol. 8, Issue 3, pp. 367-377.

Anonymous, "Access Control List," wikipedia.com, https://en.wikipedia.org/wiki/Access_control_list, Last accessed Feb. 10, 2018.

* cited by examiner

I/O AUTHORIZATION CONTROL IN SHARED STORAGE SYSTEMS

BACKGROUND

Field of the Invention

This invention relates to systems and methods for controlling I/O authorization in storage systems.

Background of the Invention

As network environments and storage-area-networks grow in usage and popularity, an increasing number of subscribers and applications share connectivity to storage devices and volumes (physical or logical). Utilizing shared storage typically simplifies management and enables a single logical resource to be used by multiple subscribers or applications. It also typically reduces the underutilization of storage resources. This is because different systems or application may require less storage than others, and sharing storage allows the different systems or application to use the amount of storage they need without wasting or underutilizing storage. As needs change, more or less storage may be allocated to the shared storage environment, thereby simplifying the scaling of storage resources.

Despite its advantages, shared storage is not without drawbacks. For example, shared storage may lead to resource contention as multiple systems or applications attempt to access the shared storage. Shared storage may also give rise to different security issues. Because multiple systems or applications may access the same storage, potential arises for certain systems or applications to access data or storage space that is only intended for or authorized to be used by other systems or applications. Although different security products may be available to limit access to certain data, these security products typically don't protect data at the volume level. As a result, programs such as I/O channel programs may be used to directly access data sets outside of normal access methods and security procedures. For example, a program may be written with a STARTIO instruction to issue READ commands to access data that should be within protected datasets, or WRITE commands to corrupt the same data.

In view of the foregoing, what are needed are systems and methods to add an additional layer of security to shared storage and decrease the potential that shared data or volumes will be accessed in an unauthorized manner.

SUMMARY

The invention has been developed in response to the present state of the art and, in particular, in response to the problems and needs in the art that have not yet been fully solved by currently available systems and methods. Accordingly, the invention has been developed to provide improved systems and methods for limiting I/O access in shared storage systems. The features and advantages of the invention will become more fully apparent from the following description and appended claims, or may be learned by practice of the invention as set forth hereinafter.

Consistent with the foregoing, a method for limiting I/O access in shared storage systems is disclosed. In one embodiment, such a method includes establishing, for a volume, a list of address spaces that are authorized to access the volume. The method further receives an I/O request to access the volume and determines whether the I/O request originates from one of the address spaces identified in the list. If the I/O request originates from one of the address spaces in the list, the method passes the I/O request to the volume. If, on the other hand, the I/O request does not originate from one of the address spaces in the list, the method blocks the I/O request. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
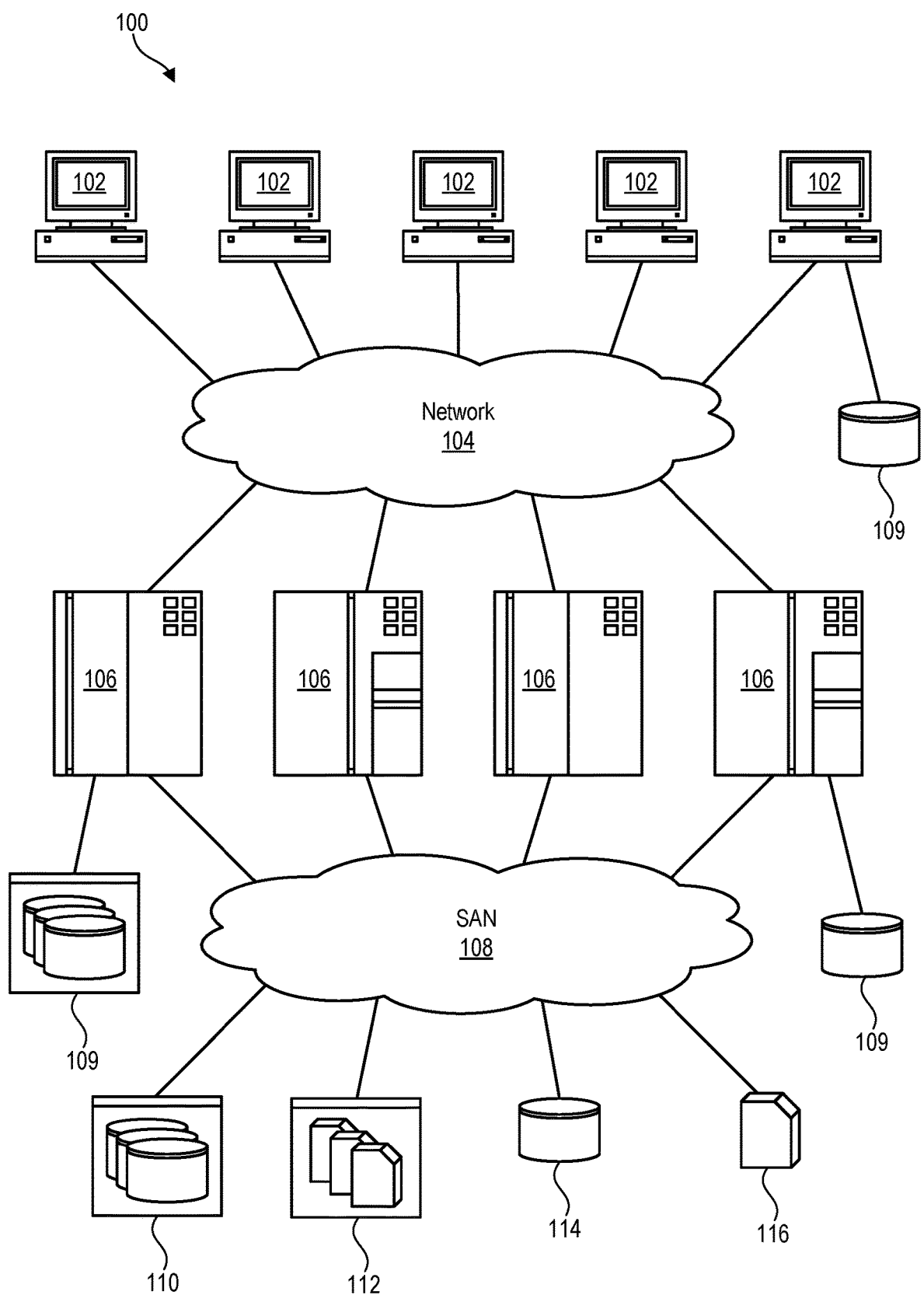
FIG. 1 is a high-level block diagram showing one example of a network environment in which systems and methods in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented only by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
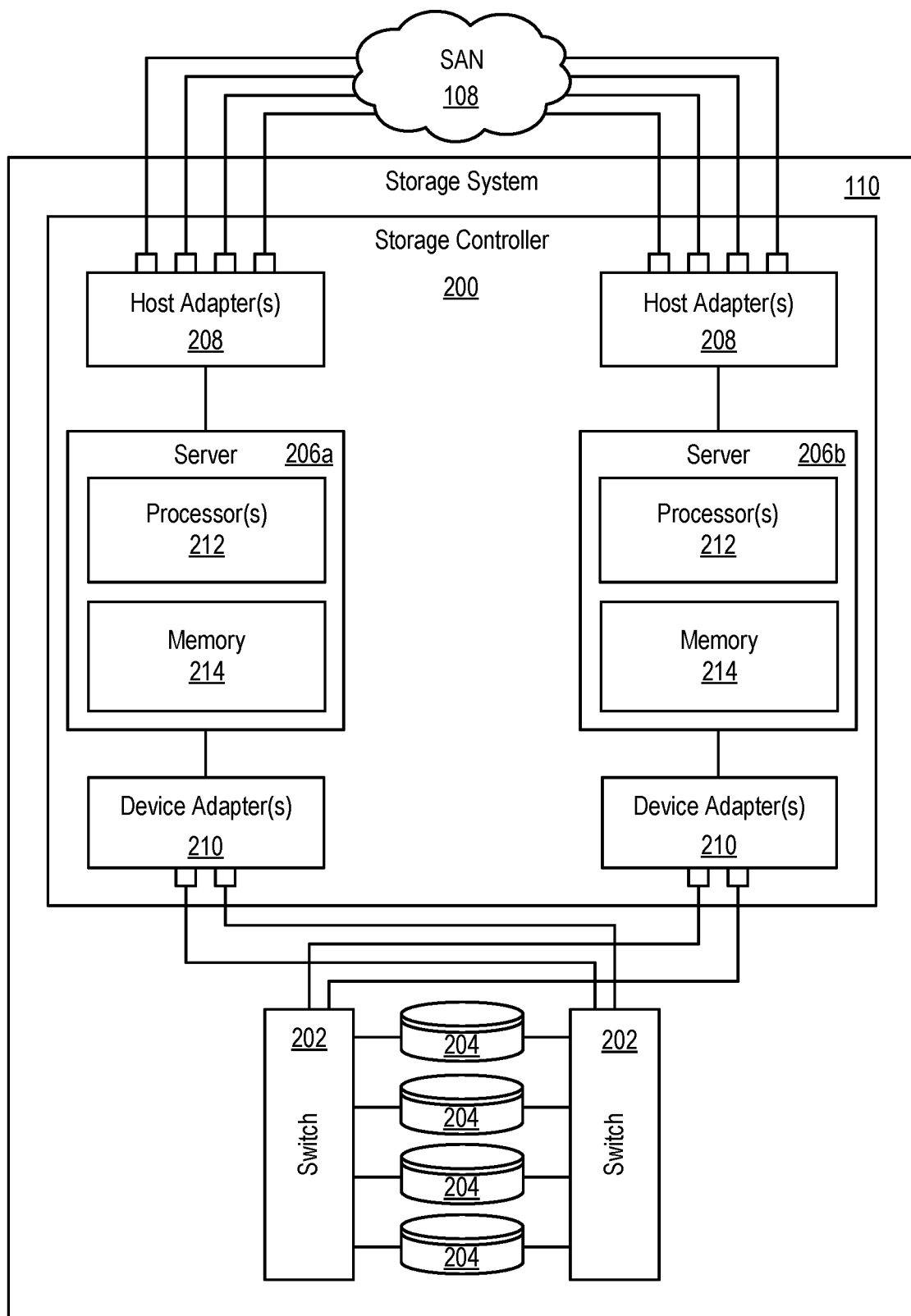
FIG. 2 is a high-level block diagram showing one example of a storage system for use in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206*a*, 206*b* may provide redundancy to ensure that data is always available to connected hosts 106. Thus, when one server 206*a* fails, the other server 206*b* may pick up the I/O load of the failed server 206*a* to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
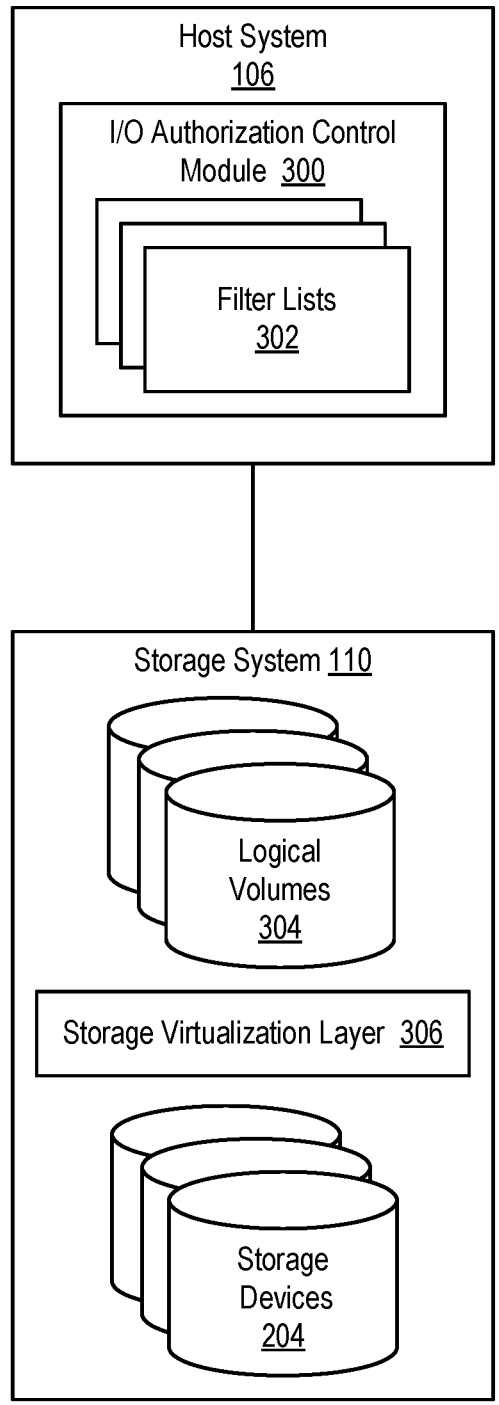
FIG. 3 is a high-level block diagram showing an I/O authorization control module configured to limit I/O access in a shared storage system.

Referring to FIG. 3, as previously mentioned, as network environments and storage-area-networks grow in usage and popularity, an increasing number of subscribers (e.g., host systems 106) and applications (e.g., applications running on host systems 106) may be configured to share connectivity to storage devices 204 and logical volumes 304 that are virtualized from the storage devices 204. A storage virtualization layer 306 may provide the mapping between the logical volumes 304 and the storage devices 204. Shared storage typically simplifies management and enables a single logical resource to be used by multiple subscribers or applications. It also typically reduces the underutilization of storage resources. This is because different systems or application may require different amounts of storage, and sharing the storage enables the different systems or application to use the amount of storage they need without wasting or underutilizing storage. As needs change, more or less storage may be allocated to the shared storage environment, thereby simplifying the scaling of storage resources.

Despite its advantages, shared storage is not without drawbacks. For example, shared storage may lead to resource contention as multiple systems or applications attempt to access the shared storage. Shared storage may also give rise to various security issues. Because multiple systems or application may access the same storage, the potential arises for certain systems or applications to access data or storage space that is only intended for or authorized to be used by other systems or applications. Although different security products may be available to limit access to data, these security products typically don't protect data at the volume level. As a result, programs such as I/O channel programs may be used to directly access data sets outside of normal access methods and security procedures. For example, a program may be written with a STARTIO instruction to issue READ commands to access data that should be within protected datasets, or WRITE commands to corrupt the same data.

In order to address the issues identified above, systems and methods are disclosed herein to add an additional layer of security to shared storage and decrease the potential that shared data or volumes will be accessed in an unauthorized manner. This functionality may be embodied as one or more modules implemented in software, hardware, firmware, or combinations thereof. For example, in certain embodiments, an I/O authorization control module 300 may be implemented on a host system 106 to limit I/O access to certain logical volumes 304 and/or storage devices 204 on a shared storage system 110. This I/O authorization control module 300 may, in certain embodiments, protect data at the volume (either physical or logical) level. Each host system 106 that accesses the shared storage system 110 may include an I/O authorization control module 300.

In general, the I/O authorization control module 300 may provide an additional layer of security to a shared storage system 110 and decrease the potential for user error by limiting which applications or subscribers can gain access to particular logical volumes 304 or storage devices 204, or subsets thereof. For example, the I/O authorization control module 300 may ensure that only database applications have access to database data on the shared storage system 110, while other applications on the host system 106 are denied access.

As shown in FIG. 3, in certain embodiments, an I/O authorization control module 300 in accordance with the invention may utilize one or more filter lists 302 to limit I/O access to a shared storage system 110. Each filter list 302 may be associated with a particular logical or physical volume, or a subset thereof, and may contain a list of address spaces that are authorized to access the volume. In certain embodiments, each of these address spaces may be associated with a particular job or application.

Assuming each filter list 302 is associated with a logical volume 304, when an I/O request is received for a particular logical volume 304, the I/O authorization control module 300 may check whether a filter list 302 exists for the logical volume 304. If so, the I/O authorization control module 300 may check whether the I/O request originates from one of the address spaces identified in the filter list 302. If so, the I/O authorization control module 300 may pass the I/O request to the logical volume 304. If, on the other hand, the I/O request does not originate from one of the address spaces referenced in the filter list 302, the I/O authorization control module 300 may block the I/O request and thereby prevent access to the logical volume 304.

Figure 4:
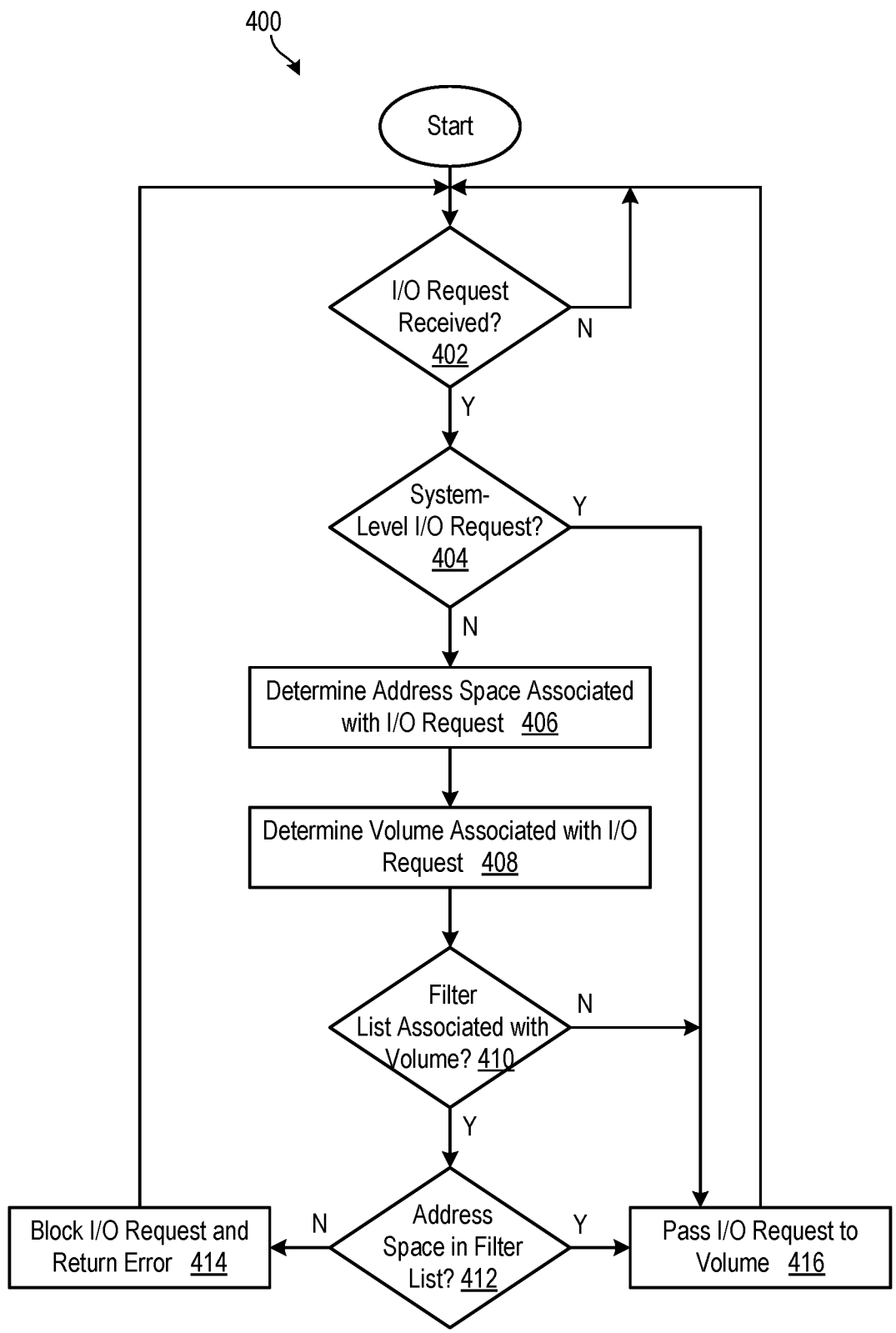
FIG. 4 is a process flow diagram showing a generalized method for limiting I/O access in a shared storage system.

Referring to FIG. 4, a process flow diagram is presented showing a generalized method 400 for limiting I/O access in a shared storage system 110. Such a method 400 may be executed by the I/O authorization control module 300 previously discussed in association with FIG. 3. As shown, the method 400 initially determines 402 whether an I/O request has been received. If so, the method 400 determines 404 whether the I/O request is a system-level I/O request (e.g., an I/O request that is associated with operating system or system recovery operations, such as initializing devices for use and/or recovering from certain types of errors,). If the I/O request is a system-level I/O request, the method 400 passes 416 the I/O request to the logical volume 304 it is intended for (thereby allowing the I/O request to be executed on the logical volume 304) and the method 400 returns to the top to wait 402 for the next I/O request.

If, at step 404, the I/O request is not a system-level I/O request, the method 400 determines 406 the address space associated with the I/O request. The method 400 further determines 408 the logical volume 304 associated with the I/O request and, at step 410, determines whether a filter list 302 is associated with the logical volume 304. If a filter list 302 is associated with the logical volume 304, the method 400 determines 412 whether the I/O request is associated with an address space in the filter list 302 (i.e., the I/O request originates from a job or application identified by address space in the filter list 302). If so, the method 400 passes 416 the I/O request to the logical volume 304 identified at step 408 and the method 400 waits 402 for the next I/O request. If not, the method 400 blocks 414 the I/O request and, in certain embodiments, returns 414 an error code or message indicating the I/O request was blocked. The method 400 then returns to the top to wait 402 for the next I/O request.

Figure 5:
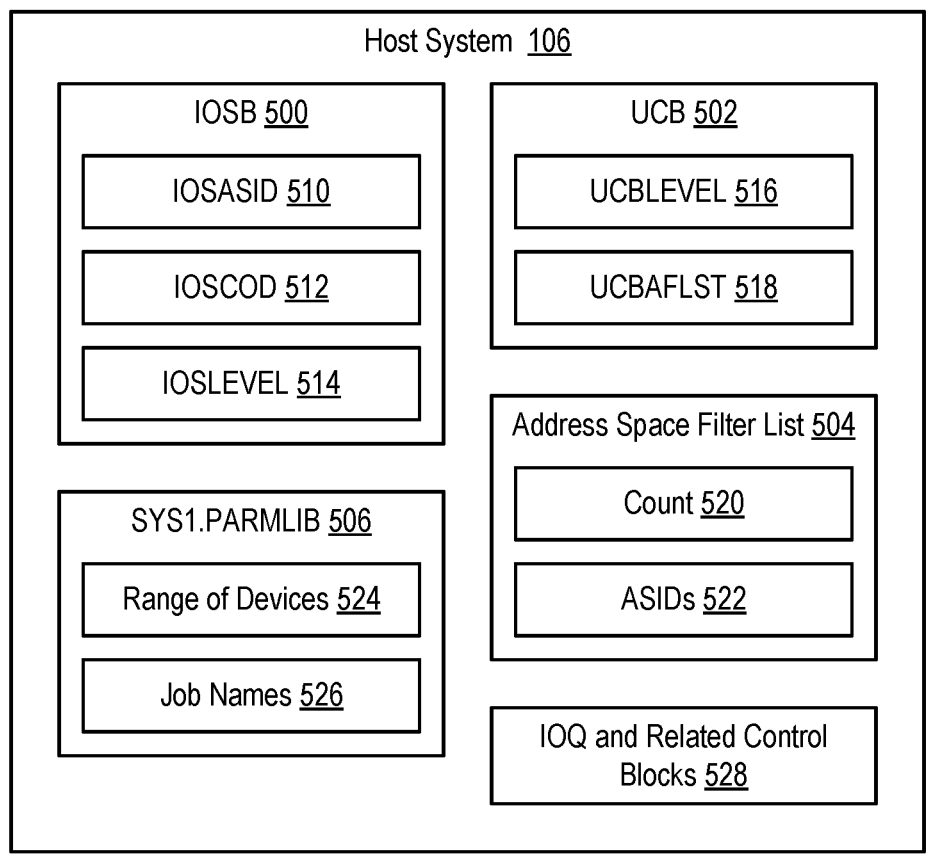
FIG. 5 is a high-level block diagram showing various control blocks and data structures in an exemplary implementation for limiting I/O access in a shared storage system.

Referring to FIG. 5, a high-level block diagram is provided showing various control blocks and data structures for use in an exemplary z/OS implementation in accordance with the invention. These control blocks and data structures are exemplary in nature and are not intended to limit the scope of the invention.

In the z/OS operating system environment, I/O drivers may invoke I/O Supervisor (IOS) to submit an I/O request by issuing a STARTIO macro. Today, this includes passing control through a Start Subchannel Queuing Routine, which will in turn call a Start Subchannel Module. The STARTIO interface includes passing an I/O Supervisor Block 500 (IOSB), which includes an IOSASID field 510 that contains an Address Space Identifier (ASID) of the address space that requested the I/O. The IOSB 500 may also contain a 1-byte IOSCOD field 512 indicating the result of the I/O request.

In z/OS, an I/O device is represented by a Unit Control Block 502 (UCB). The UCB 502 may contain a 1-byte UCBLEVEL field 516, and a 1-byte IOSLEVEL field 514, which together dictate a hierarchy of allowable I/O requests. An I/O request will only be passed to a device/volume if the IOSLEVEL 514 in the IOSB 500 is greater than or equal to the UCBLEVEL 516 in the UCB 502. A UCBLEVEL 516 and IOSLEVEL 514 of one is the lowest level, which may be referred to as a User Level or Normal Level, which is used for normal application I/O. Any level greater than one may be used for system-level operations. For example, the I/O SUPERVISOR may raise the UCBLEVEL 516 to a hexadecimal value of x'0A' and issue I/O requests with an IOSLEVEL 514 having a hexadecimal value of x'0A' when establishing path groups to a device. This temporarily prevents other I/O requests from being initiated during that time, which prevents normal application I/O from interfering with system-level I/O. Systems and methods in accordance with the invention may enable only a limited number of address spaces to request I/O from particular devices/volumes, while also enabling system-level I/O to proceed without filtering.

In certain embodiments, a user may input one or more device exclusivity lists into a SYS1.PARMLIB member 506, each of which may contain a range 524 of devices/volumes and names 526 of jobs that are authorized to perform I/O to the devices/volumes. In such an implementation, the jobs associated with the job names 526 are the only jobs authorized to perform I/O to the range of devices/volumes. I/O requests from other jobs will be rejected. Using this information 506, z/OS may build the control blocks shown in FIG. 5 when the devices/volumes are first brought online to the system, either at initial program load (IPL) time or through the device vary online process.

Systems and methods in accordance with the invention may introduce a new UCBAFLST field 518 within the UCB 502, and a new control block 504 referred to herein as an address space filter list 504, which is pointed to by the UCBAFLST field 518. The address space filter list 504 may contain an array with a count 520 of allowable address spaces followed by an ASID 522 for each of the allowable address spaces. Alternatively, the address space filter list 504 may be embodied as a hash table containing the allowable ASIDs and the UCBAFLST field 518 may point to this hash table. The ASID may be used as the hash table key, and the hash table may contain a representation for "ASID allowed" or "ASID not allowed."

Figure 6:
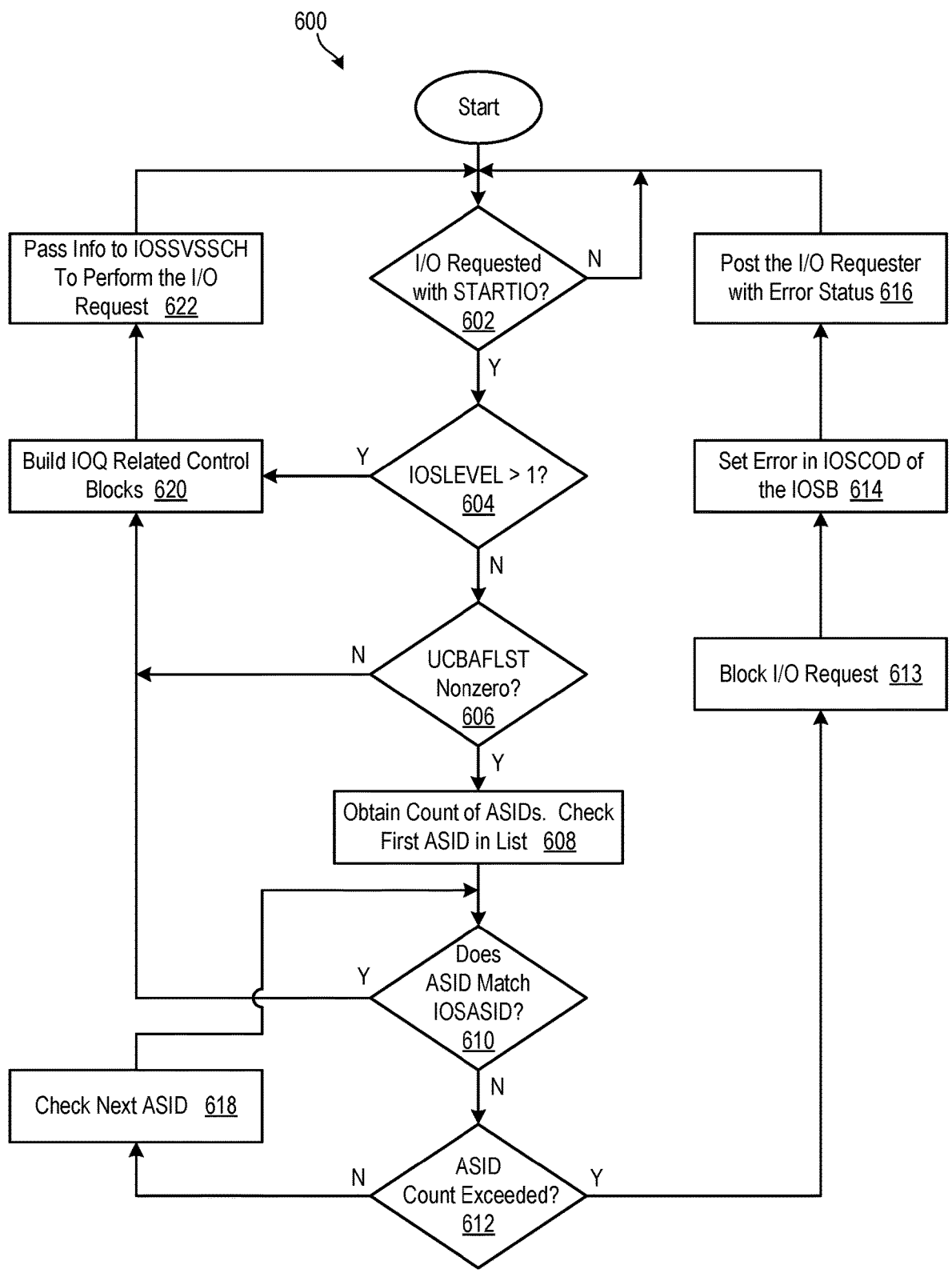
FIG. 6 is a process flow diagram showing a more specific exemplary method for limiting I/O access in a shared storage system.

Referring to FIG. 6, while continuing to refer generally to FIG. 5, a process flow diagram is provided showing how the control blocks of FIG. 5 are utilized when limiting I/O access in a shared storage system 110. The method 600 is a narrower implementation of the method 400 of FIG. 4 in a particular environment, namely the z/OS environment. Systems and methods in accordance with the invention may introduce new "startability" checks within the Start Subchannel Queueing Routine. When the Start Subchannel Queueing Routine obtains control for a STARTIO request at step 602, the I/O SUPERVISOR checks 604 whether the content of the IOSLEVEL field 514 is greater than one, which indicates that the I/O request is associated with system-level I/O. If so, the method 600 bypasses most of the processing logic in the method 600 and proceeds to build 620 I/O Queue Element (IOQ) and related control blocks 528 (See FIG. 5) and pass 622 information to the IOSVSSCH process to start the I/O request.

If, at step 604, the content of the IOSLEVEL field 514 is not greater than one, the I/O SUPERVISOR checks 606 whether the content of the UCBFLST field 518 is nonzero to determine if an address space filter list 504 exists for the device/volume that is the target of the I/O request. If the content of the UCBFLST field 518 is not nonzero, then no address space filter list 504 exists for the device/volume and the I/O request is processed in the conventional manner without invoking the filtering logic.

If, on the other hand, the content of the UCBFLST field 518 is nonzero, then the I/O SUPERVISOR retrieves the address space filter list 504 and traverses the list of allowable address spaces to determine if the ASID contained in the IOSASID field 510 is referenced in the list 504. This includes obtaining 608 the first field 520 in the address space filter list 504 to get the count of ASIDs 522, and checking 608 the next field, which is the first ASID within the array. If the ASID in the address space filter list 504 matches 610 the ASID in the IOSASID field 510 of the IOSB control block 500, then the I/O request is passed to the device/volume that is the target of the I/O request. If not, the remaining ASIDs in the array are checked 618 until either a match is found or the end of the address space filter list 504 is reached (i.e., the ASID count 520 is exceeded 612).

If the end of the address space filter list 504 is reached and no match is found, thereby indicating that the IOSASID 510 did not match any of the allowable ASIDs in the address space filter list 504, then the I/O request is blocked 613 (i.e., not passed to the device/volume). When this occurs, the method 600 may insert 614 an error code into the IOSCOD field 512 of the IOSB 500 to indicate that the I/O request was not allowed to complete. In certain embodiments, the method 600 further schedules an IOS post status routine to post 616 the I/O requestor with the error status.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for limiting I/O access in a shared storage system, the method comprising:
   receiving an I/O request to access a volume;
   determining whether the I/O request is a system-level I/O request, wherein the system-level I/O request is an I/O request that is associated with operating system or system recovery operations;
   in response to determining that the I/O request is a system-level I/O request, executing the I/O request against the volume;
   in response to determining that the I/O request is not a system-level I/O request, reading an indicator associated with the volume to determine whether an address space filter list exists for the volume, the address space filter list documenting address spaces that are authorized to access the volume;
   in response to determining that the address space filter list does not exist for the volume, executing the I/O request against the volume;
   in response to determining that the address space filter list does exist for the volume, determining whether the I/O request originates from one of the address spaces identified in the address space filter list;
   in response to determining that the I/O request originates from one of the address spaces in the address space filter list, executing the I/O request against the volume; and
   in response to determining that the I/O request does not originate from one of the address spaces in the address space filter list, blocking the I/O request.

2. The method of claim 1, wherein the volume is one of a logical volume and a physical volume.

3. The method of claim 1, further comprising setting an error code in the event the I/O request is blocked.

4. The method of claim 1, wherein the address space filter list is implemented as a hash table.

5. The method of claim 1, wherein each address space is associated with a particular address space identifier.

6. The method of claim 1, wherein the address space filter list is maintained at the host-system level.

7. A computer program product for limiting I/O access in a shared storage system, the computer program product comprising a non-transitory computer-readable storage medium having computer-usable program code embodied therein, the computer-usable program code configured to perform the following when executed by at least one processor:
   receive an I/O request to access a volume;
   determine whether the I/O request is a system-level I/O request, wherein the system-level I/O request is an I/O request that is associated with operating system or system recovery operations;
   in response to determining that the I/O request is a system-level I/O request, execute the I/O request against the volume;
   in response to determining that the I/O request is not a system-level I/O request, read an indicator associated with the volume to determine whether an address space filter list exists for the volume, the address space filter list documenting address spaces that are authorized to access the volume;
   in response to determining that the address space filter list does not exist for the volume, execute the I/O request against the volume;
   in response to determining that the address space filter list does exist for the volume, determine whether the I/O request originates from one of the address spaces identified in the address space filter list;
   in response to determining that the I/O request originates from one of the address spaces in the address space filter list, execute the I/O request against the volume; and
   in response to determining that the I/O request does not originate from one of the address spaces in the address space filter list, block the I/O request.

8. The computer program product of claim 7, wherein the volume is one of a logical volume and a physical volume.

9. The computer program product of claim 7, wherein the computer-usable program code is further configured to set an error code in the event the I/O request is blocked.

10. The computer program product of claim 7, wherein the address space filter list is implemented as a hash table.

11. The computer program product of claim 7, wherein each address space is associated with a particular address space identifier.

12. The computer program product of claim 7, wherein the address space filter list is maintained at the host-system level.

13. A system for limiting I/O access in a shared storage system, the system comprising:

at least one processor;

at least one memory device operably coupled to the at least one processor and storing instructions for execution on the at least one processor, the instructions causing the at least one processor to:

receive an I/O request to access a volume;

determine whether the I/O request is a system-level I/O request, wherein the system-level I/O request is an I/O request that is associated with operating system or system recovery operations;

in response to determining that the I/O request is a system-level I/O request, execute the I/O request against the volume;

in response to determining that the I/O request is not a system-level I/O request, read an indicator associated with the volume to determine whether an address space filter list exists for the volume, the address space filter list documenting address spaces that are authorized to access the volume;

in response to determining that the address space filter list does not exist for the volume, execute the I/O request against the volume;

in response to determining that the address space filter list does exist for the volume, determine whether the I/O request originates from one of the address spaces identified in the address space filter list;

in response to determining that the I/O request originates from one of the address spaces in the address space filter list, execute the I/O request against the volume; and in response to determining that the I/O request does not originate from one of the address spaces in the address space filter list, block the I/O request.

14. The system of claim 13, wherein the volume is one of a logical volume and a physical volume.

15. The system of claim 13, wherein the instructions further cause the at least one processor to set an error code in the event the I/O request is blocked.

16. The system of claim 13, wherein the address space filter list is implemented as a hash table.

17. The system of claim 13, wherein each address space is associated with a particular address space identifier.

* * * * *